United States Patent [19]
Arnold et al.

[11] Patent Number: 6,057,417
[45] Date of Patent: May 2, 2000

[54] HIGH TEMPERATURE POLYMERS WITH LOW DIELECTRIC PROPERTIES

[75] Inventors: Fred E. Arnold; Thuy D. Dang, both of Centerville; Robert J. Spry, Tipp City; Max D. Alexander, Kettering; Patrick T. Mather, Beavercreek, all of Ohio

[73] Assignee: The United States of America as represented by the Secretary of the Air Force, Washington, D.C.

[21] Appl. No.: 09/321,447

[22] Filed: May 27, 1999

[51] Int. Cl.$^7$ ..................................................... C08G 63/02
[52] U.S. Cl. .......................... 528/183; 528/185; 528/190; 528/191; 528/193; 528/272; 528/289; 528/291; 528/298; 528/308; 528/335; 528/361; 528/401
[58] Field of Search ...................... 528/183, 185, 528/190, 191, 193, 272, 289, 291, 298, 308, 335, 361, 401

[56] References Cited

U.S. PATENT DOCUMENTS

| | | |
|---|---|---|
| 5,106,940 | 4/1992 | Dang et al. . |
| 5,136,012 | 8/1992 | Dang et al. . |
| 5,312,895 | 5/1994 | Dang et al. . |
| 5,492,996 | 2/1996 | Dang et al. . |

OTHER PUBLICATIONS

T. Dang, P. Mather, M. Alexander, R. Spry, F. Arnold, Achieving High $T_g$ and Low Dielectric Constant Using Aromatic Benzoxazole Polymers, Polymer Preprints, vol. 39, No. 2, Aug. 1998, pp 804–805, published Jul. 16, 1998.

*Primary Examiner*—Samuel A. Acquah
*Attorney, Agent, or Firm*—Charles E. Bricker; Thomas L. Kundert

[57] ABSTRACT

A polymer system having repeating units of the formula:

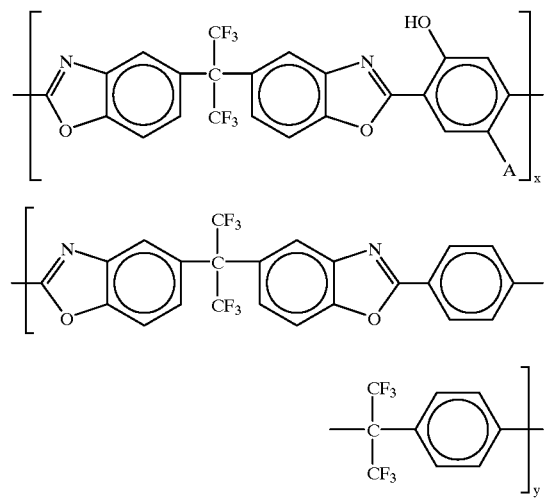

wherein A is —H or —OH, x has a value of 0.5 to 1.0 and y has a value of 1.0-x, exhibits a high glass transition temperature ($T_g$) and a low dielectric constant. The polymer system is useful in the area of microelectronic packaging.

9 Claims, No Drawings

HIGH TEMPERATURE POLYMERS WITH LOW DIELECTRIC PROPERTIES

RIGHTS OF THE GOVERNMENT

The invention described herein may be manufactured and used by or for the Government of the United States for all governmental purposes without the payment of any royalty.

BACKGROUND OF THE INVENTION

The present invention relates to novel polymer compositions that can be used for microelectronic packaging.

Fluorine-containing polymeric materials are used in a variety of space and aerospace applications. Although the costs of such materials are high, they have the desirable characteristic of lowering the dielectric constant of a polymeric system. Low dielectric properties of a material are of particular importance in the area of microelectronic packaging. Interconnect processing of functional devices on the silicon chip will soon require insulators with dielectric constants from 2.0–2.4. These materials must also exhibit $T_g$'s between 350–400° C., excellent thermo-oxidative stability, and low moisture uptake to be compatible with lead-bath processing.

A number of high performance polymer systems meet the thermal and thermo-oxidative requirements. We have prepared novel polymers and copolymers that exhibit lower dielectric properties while meeting or exceeding the thermal and thermo-oxidative requirements.

Accordingly, it is an object of the present invention to provide polymers and copolymers which exhibit low dielectric properties, high $T_g$'s, excellent thermo-oxidative stability, and low moisture uptake.

Other objects, aspects and advantages of the present invention will be apparent to those skilled in the art from a reading of the following detailed disclosure of the invention.

SUMMARY OF THE INVENTION

In accordance with the present invention there is provided a polymer system having repeating units of the formula:

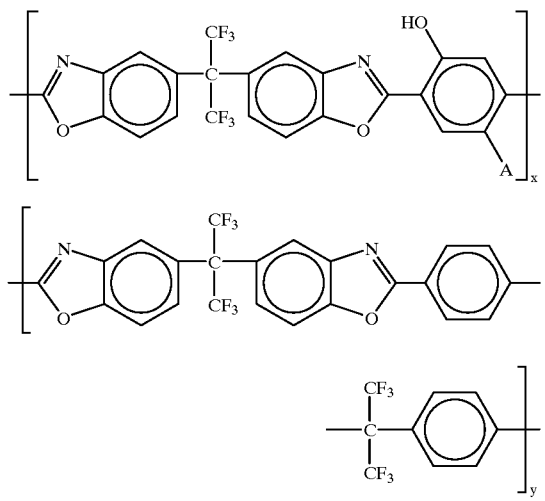

wherein A is —H or —OH, x has a value of 0.5 to 1.0 and y has a value of 1.0-x.

Homopolymers, i.e., x=1 in the formula above, can be prepared by the polycondensation of 2-hydroxyterephthalic acid (MHT) or 2,5-dihydroxyterephthalic acid (DHT) with 2,2-bis(3-amino-4-hydroxyphenyl)hexafluoropropane (BAHH) in polyphosphoric acid (PPA). Polymerizations can be carried out at monomer concentrations of about 12 wt % and reaction temperatures up to 180° C. Copolymers are prepared in an analogous fashion using 2,2-bis(4-carboxyphenyl) hexafluoropropane (BCPH) as the coacid monomer. The polymers are isolated by precipitation in water and then extracted in water until free of acid.

The following examples illustrate the invention. The monomer, 2-hydroxyterephthalic acid (MHT), was prepared by the displacement reaction of 2-bromoterephthalic acid and sodium hydroxide in the presence of sodium acetate and copper powder. Recrystallization from ethanol provided white crystals, m.p. 325–326° C. 2,5-Dihydroxyterephthalic acid (DHT) was purchased from Sigma-Aldrich, Inc., St. Louis, Mo., and recrystallized from ethanol, m.p. 319–320° C. 2,2-Bis(4-carboxyphenyl) hexafluoropropane (BCPH) was purchased from TCI America, Portland, Oreg., and used as received. 2,2-Bis(3-amino4-hydroxyphenyl) hexafluoropropane (BAHH) was purchased from Daychem Labs, Inc., Dayton, Ohio, and used as received.

EXAMPLE I

Into a 250 ml resin flask, equipped with a high torque mechanical stirrer, a nitrogen inlet, and a nitrogen outlet, were placed 1.8213 g (10 mmol) of hydroxyterephthalic acid, 3.6626 g (10 mmol) of 2,2-bis(3-amino4-hydroxyphenyl)hexafluoropropane, and 34.21 g of 83% polyphosphoric acid (PPA). The resultant mixture was heated slowly to 100° C. in an oil bath, then maintained at that temperature for sixteen hours. The temperature was then raised slowly to 140° C. for one hour, 160° C. for two hours and finally to 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 2.06 dl/g was measured in MSA (methane sulfonic acid) at 30° C.

EXAMPLE II

Into a 250 ml resin flask, equipped with a high torque mechanical stirrer, a nitrogen inlet, and a nitrogen outlet, were placed 1.6392 g (9 mmol) of hydroxyterephtalic acid, 0.3923 g (1 mmol) of 2,2-bis(4-carboxyphenyl) hexafluoropropane, 3.6626 g (10 mmol) of 2,2-bis-(3-amino-4-hydroxyphenyl)hexafluoropropane, and 35.5 g of 83% PPA (polyphosphoric acid). The resultant mixture was heated slowly to 100° C. in an oil bath, then maintain that temperature for sixteen hours. The temperature was then raised slowly to 140° C. for one hour, 160° C. for two hours and finally at 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 1.3 dl/g was measured in MSA at 30° C.

EXAMPLE III

Into a 250 ml resin flask, equipped with a high torque mechanical stirrer, a nitrogen inlet, and a nitrogen outlet, were placed 1.2749 g (7 mmol) of hydroxyterephtalic acid, 1.1768 g (3 mmol) of 2,2-bis(4-carboxyphenyl)hexafluoropropane, 3.6626 g (10 mmol) of 2,2-bis-(3-amino-4-hydroxyphenyl)hexafluoropropane, and 39.19 g of 83% PPA. The resultant mixture was heated slowly to 100° C. in an oil bath, then maintain that temperature for sixteen hours. The temperature was then raised slowly to 140° C. for one hour, 160° C. for two hours and finally at 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 2.34 dl/g was measured in MSA at 30° C.

EXAMPLE IV

Into a bottom of a 250 ml resin flask, equipped with a high torque mechanical stirrer, a nitrogen inlet, and a nitrogen outlet, were placed 0.9106 g (5 mmol) of hydroxyterephtalic acid, 1.9613 g (5 mmol) of 2,2-bis(4-carboxyphenyl)hexafluoropropane, 3.6626 g (10 mmol) of 2,2-bis-(3-amino-4-hydroxyphenyl)hexafluoropropane, and 42.09 g of 83% PPA (polyphosphoric acid). The resultant mixture was heated slowly to 100° C. in an oil bath, then maintain that temperature for sixteen hours. The temperature was then raised slowly to 140° C. for one hour, 160° C. for two hours and finally at 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 1.35 dl/g was measured in MSA at 30° C.

EXAMPLE V

Into a bottom of a 250 ml resin flask, equipped with a high torque mechanical stirrer, a nitrogen inlet, and a nitrogen outlet, were placed 1.9813 g (10 mmol) of hydroxyterephtalic acid, 3.6626 g (10 mmol) of 2,2-bis-(3-amino-4-hydroxyphenyl)-hexafluoropropane, and 35.38 g of 83% PPA (polyphosphoric acid). The resultant mixture was heated slowly to 100° C. in an oil bath, then maintain that temperature for sixteen hours. The temperature was then raised slowly to 140° C. for one hour, 160° C. for two hours and finally at 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 3.1 dl/g was measured in MSA at 30° C.

EXAMPLE VI

Into a bottom of a 250 ml resin flask, equipped with a high torque mechanical stirrer, a nitrogen inlet, and a nitrogen outlet, were placed 1.1888 g (6 mmol) of hydroxyterephtalic acid, 0.7845 g (2 mmol) of 2,2-bis(4-carboxyphenyl)hexafluoropropane, and 2.9301 g (8 mmol) of 2,2-bis-(3-amino-4-hydroxyphenyl)hexafluoropropane, and 31.44 g of 83% PPA (polyphosphoric acid). The resultant mixture was heated slowly to 100° C. in an oil bath, then maintain that temperature for sixteen hours. The temperature was then raised slowly to 140° C. for one hour, 160° C. for two hours and finally at 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 1.34 dl/g was measured in MSA at 30° C.

EXAMPLE VII

Into a bottom of a 250 ml resin flask, equipped with a high torque mechanical stirrer, a nitrogen inlet, and a nitrogen outlet, were placed 0.9906 g (5 mmol) of hydroxyterephtalic acid, 1.9613 g (5 mmol) of 2,2-bis(4-carboxyphenyl)hexafluoropropane, and 3.6626 g (10 mmol) of 2,2-bis-(3-amino-4-hydroxyphenyl)-hexafluoropropane, and 42.09 g of 83% PPA (polyphosphoric acid). The resultant mixture was heated slowly to 100° C. in an oil bath, then maintain that temperature for sixteen hours. The temperature was then raised slowly to 140° C. for one hour, 160° C. for two hours and finally at 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 0.88 dl/g was measured in MSA at 30° C.

EXAMPLE VIII

Into a bottom of a 250 ml resin flask, equipped with a high torque mechanical stirrer, a nitrogen inlet, and a nitrogen outlet, were placed 0.3963 g (2 mmol) of hydroxyterephtalic acid, 2.3536 g (6 mmol) of 2,2-bis(4-carboxyphenyl)hexafluoropropane, and 2.9301 g (8 mmol) of 2,2-bis-(3-amino-4-hydroxyphenyl)hexafluoropropane, and 37.14 g of 83% PPA (polyphosphoric acid). The resultant mixture was heated slowly to 100° C. in an oil bath, then maintain that temperature for sixteen hours. The temperature was then raised slowly to 140° C. for one hour, 160° C. for two hours and finally at 190° C. for eighteen hours. The solution was allowed to cool to room temperature before precipitation into water (1000 ml). The resultant fibrous polymer was chopped in a Waring blender, collected by suction filtration, washed with ammonium hydroxide, then with a copious amount of water, and finally dried under reduced pressure (0.02 torr) at 110° C. An intrinsic viscosity of 0.47 dl/g was measured in MSA at 30° C.

EXAMPLE IX

Dielectric Measurements and Properties

Sample thicknesses (d) were measured by digital micrometer optical microscope, and SEM. Dielectric measurements were accomplished using an EG&G model 283 potentiostat over a frequency range from 0.1 Hz to 5 MHz with an amplitude of 5 mV rms. The EG&G software computed the real and imaginary parts of the impedance as a function of frequency, from which the capacitance C of the polymer-containing sample holder could be calculated. The sample holder consisted of two stainless steel circular plates of 0.25 inch radius r pressed against each side of the polymer film. The dielectric constants (k) were calculated in the usual manner:

$$k = Cd/\epsilon_0 \pi r^2$$

Sample thicknesses ranged from 38 μm to 134 μm, insuring that the measured dielectric constants were bulk values. The dielectric constants, as well as thermal analysis data, are shown in the following table. For comparison, a polymer and a copolymer, each lacking the hydroxyl substitution, were prepared from BAHH, terephthalic acid, and BCPH using the procedure given in the previous examples. The values for A, x and y reference the formula given previously.

TABLE

| Example | A | x | y | $T_g^a$ (°C.) | $T_g^b$ (°C.) | Moisture Uptake (%) | Dielectric constant |
|---|---|---|---|---|---|---|---|
| Comparison polymer | —H | 100 | 0 | 325 | — | — | 2.20 |
| Comparison copolymer | —H | 50 | 50 | 346 | 336 | — | 2.40 |
| I | —H | 100 | 0 | 426 | 393 | <0.2 | 2.38 |
| II | —H | 90 | 10 | 415 | 410 | <0.2 | 2.49 |
| III | —H | 70 | 30 | 373 | 371 | <0.2 | 2.14 |
| IV | —H | 50 | 50 | 362 | 353 | <0.2 | 2.23 |
| V | —OH | 100 | 0 | >450 | 454 | <0.2 | 3.02 |
| VI | —OH | 75 | 25 | >450 | — | <0.2 | — |
| VII | —OH | 50 | 50 | >450 | 430 | <0.2 | 3.14 |
| VIII | —OH | 25 | 75 | >450 | — | <0.2 | — |

[a]Differential Scanning Calorimeter data
[b]Dynamic Mechanical Analysis, loss tangent peak The polymer system of this invention exhibits excellent long term thermooxidative stability. The copolymer of Example VII, for example, exhibited a weight loss of less than about 2 percent at 600° F. (315° C.) in air over a period of 200 hours.

Various modifications may be made to the invention as described without departing from the spirit of the invention or the scope of the appended claims.

We claim:

1. A polymer system having repeating units of the formula:

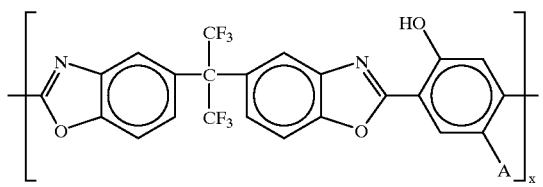

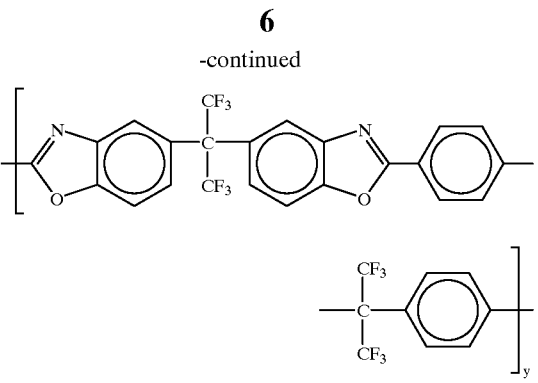

wherein A is —H or —OH, x has a value of 0.5 to 1.0 and y has a value of 1.0-x.

2. The polymer system of claim 1 wherein x has a value of 1.0 and A is —H.

3. The polymer system of claim 1 wherein x has a value of 0.9 and A is —H.

4. The polymer system of claim 1 wherein x has a value of 0.7 and A is —H.

5. The polymer system of claim 1 wherein x has a value of 0.5 and A is —H.

6. The polymer system of claim 1 wherein x has a value of 1.0 and A is —OH.

7. The polymer system of claim 1 wherein x has a value of 0.75 and A is —OH.

8. The polymer system of claim 1 wherein x has a value of 0.5 and A is —OH.

9. The polymer system of claim 1 wherein x has a value of 0.25 and A is —OH.

* * * * *